(12) United States Patent
Dziurda (10) Patent No.: US 9,212,701 B2
(45) Date of Patent: Dec. 15, 2015

(54) CLOCKED RETAINING ASSEMBLY AND TECHNIQUE

(71) Applicant: GM Global Technology Operations LLC, Detroit, MI (US)

(72) Inventor: Robert Alan Dziurda, Waterford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 372 days.

(21) Appl. No.: 13/675,667

(22) Filed: Nov. 13, 2012

(65) Prior Publication Data

US 2013/0174407 A1 Jul. 11, 2013

Related U.S. Application Data

(60) Provisional application No. 61/583,936, filed on Jan. 6, 2012.

(51) Int. Cl.

| *F16D 1/02* | (2006.01) |
|---|---|
| *F16D 13/68* | (2006.01) |
| *F16D 13/70* | (2006.01) |

(52) U.S. Cl.
CPC ................ *F16D 1/02* (2013.01); *F16D 13/683* (2013.01); *F16D 13/70* (2013.01); *Y10T 29/49947* (2015.01); *Y10T 403/7033* (2015.01)

(58) Field of Classification Search
CPC ....... F16D 13/52; F16D 13/68; F16D 13/648; F16D 13/683; F16D 13/70; F16D 25/062; F16D 25/0632; F16D 25/0638; F16D 25/12; F16D 1/02
See application file for complete search history.

(56) References Cited

U.S. PATENT DOCUMENTS

| 4,640,294 | A * | 2/1987 | Ordo ............................ 192/70.2 |
| 7,383,932 | B2 * | 6/2008 | Miyazaki et al. .......... 192/70.12 |
| 2005/0205378 | A1 * | 9/2005 | Miyazaki et al. ............ 192/48.8 |
| 2012/0272503 | A1 * | 11/2012 | Szuba ............................. 29/428 |

* cited by examiner

*Primary Examiner* — Huan Le (57) ABSTRACT

A clocked retaining assembly for use in an automotive powertrain is provided. The clocked retaining assembly includes an inner component and an outer component. The inner component has an outer side having a plurality of inner spline teeth separated by a plurality of inner grooves formed in the outer side. The outer component has an inner side having a plurality of outer spline teeth separated by a plurality of outer grooves formed in the inner side. The outer component forms a continuous inner circumferential slot through the outer spline teeth around the inner circumference of the inner side. The inner spline teeth are disposed in the inner circumferential slot. A pin extension is disposed in an inner groove an outer groove. The pin extension prevents the inner component from rotating with respect to the outer component. A method for retaining the inner and outer components is also provided.

14 Claims, 6 Drawing Sheets

CLOCKED RETAINING ASSEMBLY AND TECHNIQUE

CROSS-REFERENCE

This application claims the benefit of U.S. Provisional Application No. 61/583,936 filed on Jan. 6, 2012. The disclosure of the above application is incorporated herein by reference.

FIELD

The present disclosure relates to automotive transmission parts, and more particularly to automotive transmission parts having splines to maintain angular positions between mating parts.

BACKGROUND

The statements in this section merely provide background information related to the present disclosure and may or may not constitute prior art.

Transmissions contain several parts that are mated together via splines, or teeth and grooves, which maintain the angular position between the parts. The splines allow the splined transmission parts to slide axially along the splines, but not rotationally, because the teeth and grooves mate to each other to prevent the parts from turning relative to each other.

For example, typically, at least some of a transmission's clutch plates have outer teeth that mate with opposed grooves in a transmission case component, such as a transmission case, central support, clutch housing, or other case component. As such, toothed clutch plates may be slid into the case component along the teeth and grooves of the case component. The mated splined prevent the clutch plates from rotating relative to the case component, but the mated splines typically do not prevent axial movement of the clutch plates along or parallel to the central axis of the case component. An additional component is typically used to prevent axial movement of the clutch plates relative to the transmission case component. At one end, that additional component is typically a snap ring. The apply piston typically constrains movement of the clutch plates at another end. Other components of a transmission may also have a tooth and groove spline interconnecting arrangement.

Typically, clutch assemblies include a backing plate that also has outer splines that mate with inner splines of the transmission case component, and the snap ring prevents the backing plate from sliding past the desired axial location. The backing plate provides clutch pack support to enable proper deflection and uniform friction load distribution. The backing plate typically has a face that contacts a friction plate to provide surface finish, straightness, and taper onto which the friction plate is applied. Automotive transmissions often have multiple clutch assemblies, each with corresponding backing plates and snap rings. While the current arrangement works for its intended purpose, automotive manufacturers strive toward reducing the size and weight of components and the number of components that are needed.

SUMMARY

In one variation, which may be combined with or separate from the other variations described herein, a clocked retaining assembly includes a round transmission component having outer teeth that is maintained or held axially by opposed teeth of a surrounding component. The round transmission component may be prevented from rotational movement relative to the surrounding component by a pin ring.

In another variation, which may be combined with or separate from the other variations described herein, a clocked retaining assembly includes a transmission case component surrounding a backing plate. The backing plate's position is maintained axially within the transmission case component by axial faces of spline teeth located next to a slot formed in the spline teeth of the surrounding transmission case component. A pin ring may prevent rotational movement of the backing plate with respect to the transmission case component.

In yet another variation, which may be combined with or separate from the other variations described herein, a clocked retaining assembly for use in an automotive powertrain is provided. The clocked retaining assembly includes an inner component having an outer side. The outer side has a plurality of inner spline teeth separated by a plurality of inner grooves formed in the outer side. The clocked retaining assembly also has an outer component having an inner side. The inner side has a plurality of outer spline teeth separated by a plurality of outer grooves formed in the inner side. The outer spline teeth are configured to mate with the inner grooves, and the inner spline teeth are configured to mate with the outer grooves. The outer component forms a continuous inner circumferential slot through the outer spline teeth around the inner circumference of the inner side. The inner spline teeth are disposed in the inner circumferential slot. The inner spline teeth are disposed adjacent to and axially aligned with the outer spline teeth, the inner and outer grooves are axially aligned. The clocked retaining assembly also includes a pin component having a main body portion and a pin extension extending from the main body portion. The pin extension is disposed in a first inner groove of the plurality of inner grooves, and the pin extension is further disposed in a first outer groove of the plurality of outer grooves. The pin extension prevents the inner component from rotating with respect to the outer component.

In still another variation, which may be combined with or separate from the other variations described herein, a clutch assembly for use in an automotive powertrain is provided. The clutch assembly includes a backing plate, an outer component, and a pin component. The backing plate has an outer side, and the outer side has a plurality of backing plate spline teeth separated by a plurality of backing plate grooves formed in the outer side. The outer component has an inner side, and the inner side has a plurality of outer spline teeth separated by a plurality of outer grooves formed in the inner side. The outer spline teeth are configured to mate with the backing plate grooves, and the backing plate spline teeth are configured to mate with the outer grooves. The outer component forms a continuous inner circumferential slot through the outer spline teeth around the inner circumference of the inner side. The backing plate spline teeth are disposed in the inner circumferential slot. The backing plate spline teeth are disposed adjacent to and aligned with the outer spline teeth, and the inner and outer grooves are axially aligned. The pin component has a main body portion and a pin extension extending from the main body portion. The pin extension is disposed in a first backing plate groove of the plurality of backing plate grooves, and the pin extension is further disposed in a first outer groove of the plurality of outer grooves. The pin extension prevents the backing plate from rotating with respect to the outer component.

In still another variation, which may be combined with or separate from the other variations described herein, a method for retaining an inner splined component to an outer splined component is provided. The method includes a step of sliding the inner splined component along the outer splined component until the inner splined component reaches an inner circumferential slot formed in the outer splined component. The method further includes locating the inner splined component within the inner circumferential slot, and rotating the inner splined component within the inner circumferential and aligning inner spline teeth of the inner splined component with inner spline teeth of the outer splined component. The method also includes inserting at least one locking pin into at least one inner groove formed by edges of the inner spline teeth and inserting the at least one locking pin into at least one outer groove formed by edges of the outer spline teeth.

Further features and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides a clocked retaining assembly, including inner and outer transmission components that each have splines to mate the two components together. The inner component has splines disposed around its outer edge that are configured to mate with complimentary splines disposed on an inner edge of the outer component. The outer component has an inner circumferential slot formed through the spline teeth of the outer component. The spline teeth of the outer component are not present within the inner circumferential slot. Accordingly, the spline teeth of the outer component do not prevent the inner component from rotating with respect to the outer component when the inner component is located with the circumferential slot. Therefore, when the inner component is located within the circumferential slot, the inner component may then be rotated to align the male spline teeth of the inner component with the male spline teeth of the outer component. When the male spline teeth of the inner component are aligned with an overlapping the male spline teeth of the outer component, the male spline teeth of the outer component prevent the inner component from axially moving with respect to the outer component. A locking pin or extensions of a pin plate may be inserted into the female pin grooves of each of the components to prevent rotational movement of the components with respect to each other.

Figure 1A:
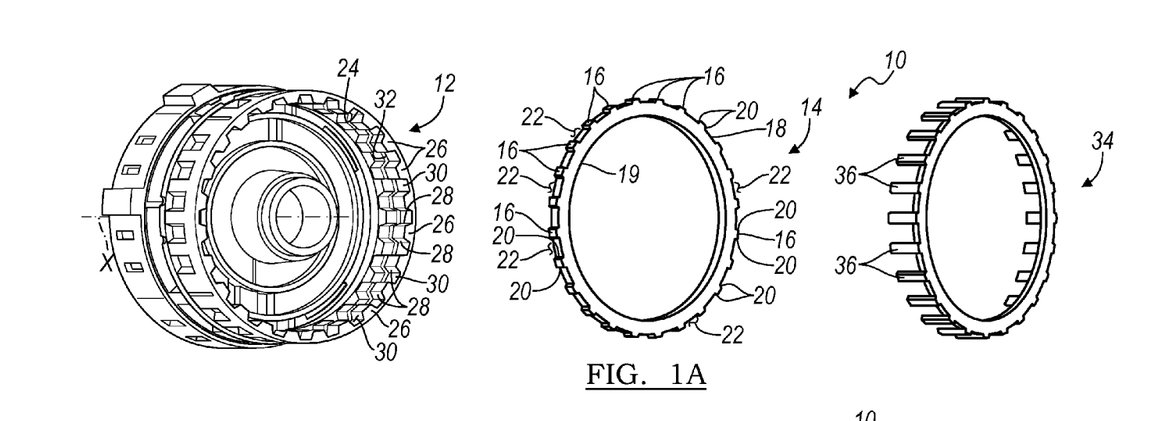
FIG. 1A is an exploded perspective view of a clocked retaining assembly in accordance with the principles of the present disclosure.
Figure 1B:
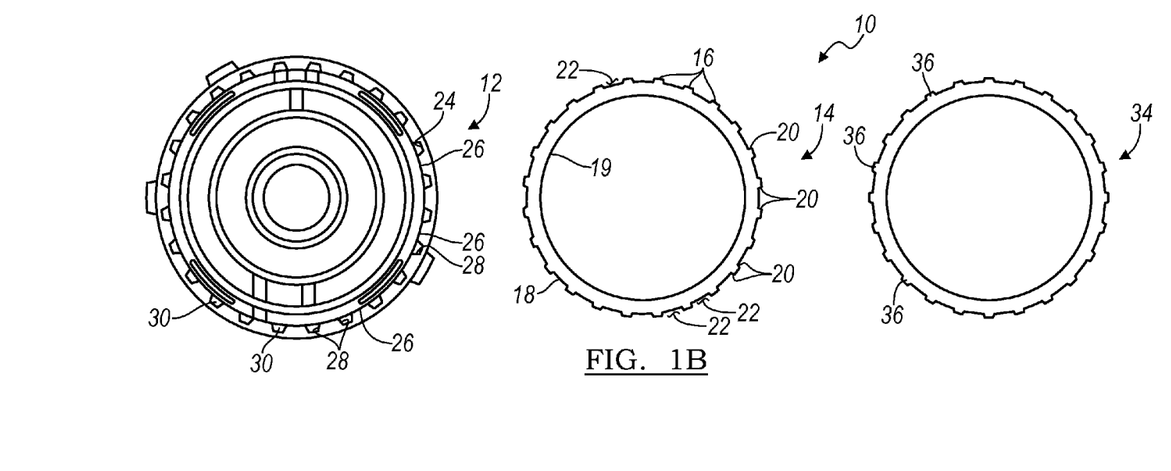
FIG. 1B is an exploded plan view of the clocked retaining assembly of FIG. 1A, according to the principles of the present disclosure.

With reference to FIGS. 1A-1B, an exemplary clocked retaining assembly is illustrated in an exploded view and generally designated at 10. The clocked retaining assembly 10 includes a pair of transmission components, which in this example are a central support connected to a transmission case (herein referred to as a transmission case component 12) and a backing plate 14.

In this example, the backing plate 14 has a generally annular shape having an outer surface 18 and an opposed inner surface 19. A plurality of male spline teeth 16 is disposed around the circumference of the outer surface 18 of the backing plate 14. Each male spline tooth 16 has edges 20 that define female grooves 22 between the male spline teeth 16.

The transmission case component 12 is disposed concentrically around the backing plate 14, in this embodiment. The transmission case component 12 has a splined inner surface 24 that is configured to mate with the outer surface 18 of the backing plate 14. Accordingly, the inner surface 24 of the transmission case component 12 has a plurality of male spline teeth 26 disposed around its inner circumference. The male spline teeth 26 of the transmission case component have edges 28 that define female grooves 30 between each of the of the male spline teeth 26. As such, the male spline teeth 16 of the backing plate 14 can be slid into the female grooves 30 of the transmission case component 12, and at the same time, the male spline teeth 26 of the transmission case component 12 are slid into the female grooves 22 of the backing plate 14.

A circumferential ring-shaped slot 32 is machined or otherwise formed through the male spline teeth 26 of the transmission case component 12. The circumferential slot 32 extends around the inner circumference of the transmission case component 12 through the male spline teeth 26 of the transmission case component 12. The circumferential slot 32 is wide enough to fit the backing plate 14 within the circumferential slot 32 so that the backing plate 14 can be rotated within the circumferential slot 32. The circumferential slot 32 is flush with the valleys of the female grooves 30, in this embodiment, forming a circular groove around the inner surface 24 of the transmission case component 12. The male spline teeth 26 are absent from the circumferential slot 32, in this embodiment.

As explained above, the splines 16, 22 of the backing plate 14 mate with the splines 26, 30 of the transmission case component 12. As such, the backing plate 14 may be slid along the splines 26, 30 of the transmission case component 12 in an axial direction along the central axis X of the transmission case component 12. The splines 16, 22, 26, 30, prevent the backing plate 14 from being rotated with respect to the transmission case component 12 around the central axis X when the splines 16, 22 of the backing plate 14 are mated with the splines 26, 30 of the transmission case component 12. If the backing plate 14 is slid into the circumferential slot 32 of the transmission case component 12, however, the male splines 26 no longer prevent the backing plate 14 from being rotated with respect to the transmission case component 12 around the central axis X. This is because the transmission case component 12 has no male spline teeth 26 present in the circumferential slot 32.

An annular pin plate 34 is inserted into the transmission case component 12 to prevent the backing plate 14 from rotating with respect to the transmission case component 12 around the central axis X when the backing plate 14 is located within the circumferential slot 32. The pin plate 34 has a plurality of extensions 36 that may be inserted into the female grooves 30 of the transmission case component 12 and the female grooves 22 of the backing plate 14. As such, the extensions 36 of the pin plate 34 lock the backing plate 14 from rotating with respect to the transmission case component 12.

The extensions 36 may be posts, pins, or legs as illustrated in FIG. 1A. The extensions 36 could have any other suitable configuration that is operable to fit in the female grooves 22, 30 to prevent rotation between the backing plate 14 and the transmission case component 12. The pin plate 34 is shown having a ring shape, but other shapes may also be used, such as a circular non-hollow shape or a hub with spokes reaching out to the extensions 36, by way of example. The pin plate 34 can be a clutch reaction plate or apply ring, in some embodiments. The pin plate 34 may have any suitable number of extensions 36, such as 1-40, or one, two, nine, or twenty-three extensions, by way of example.

Each of the transmission case component 12, the backing plate 14, and the pin plate can be formed of steel or any other suitable material.

Figure 2A:
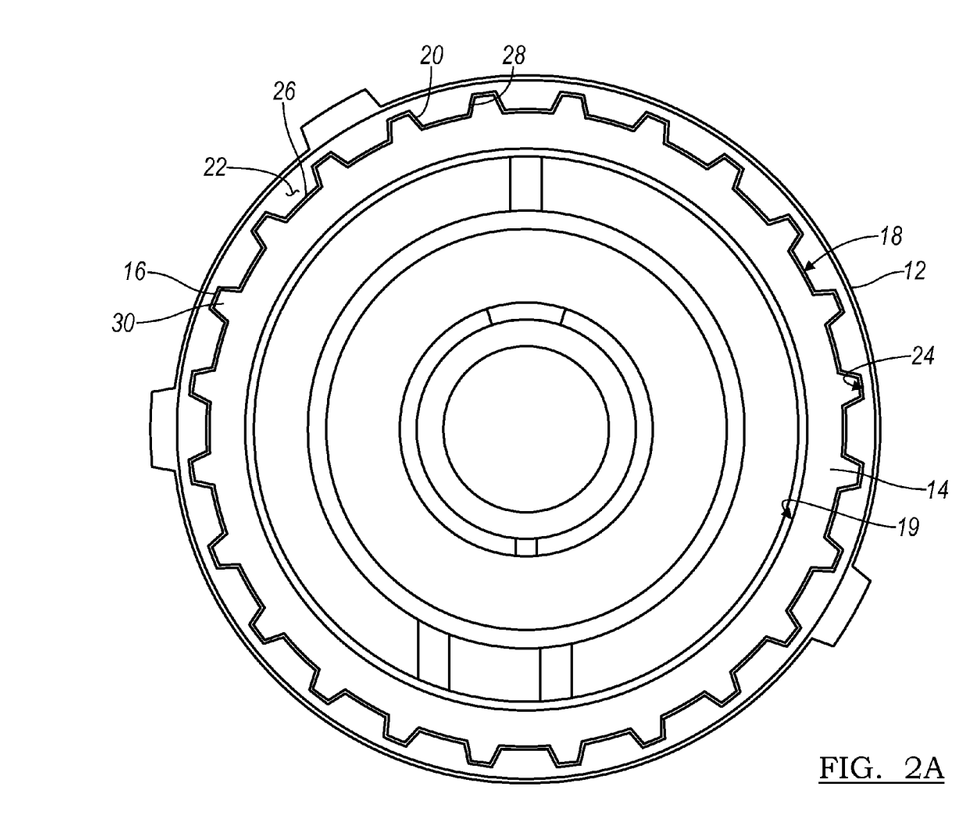
FIG. 2A is a plan view of a portion of the clocked retaining assembly of FIGS. 1A-1B, partially assembled in accordance with the principles of the present disclosure.
Figure 2B:
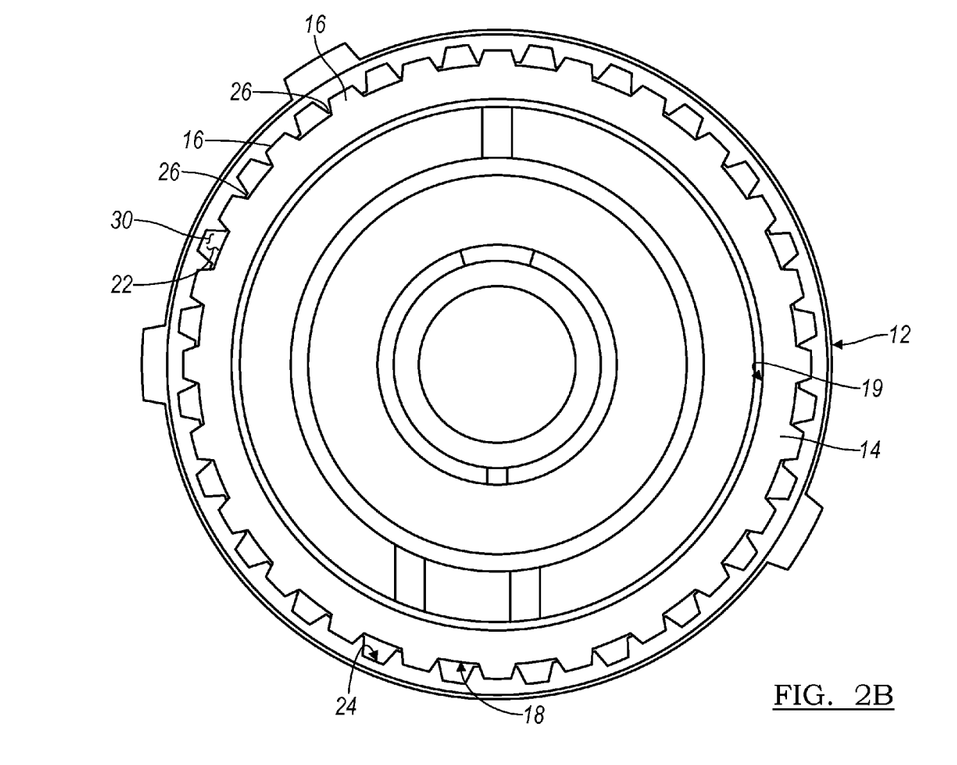
FIG. 2B is a plan view of the portion of the clocked retaining assembly of FIG. 2A, wherein the inner component in turned within a slot of the outer component, in accordance with the principles of the present disclosure.
Figure 2C:
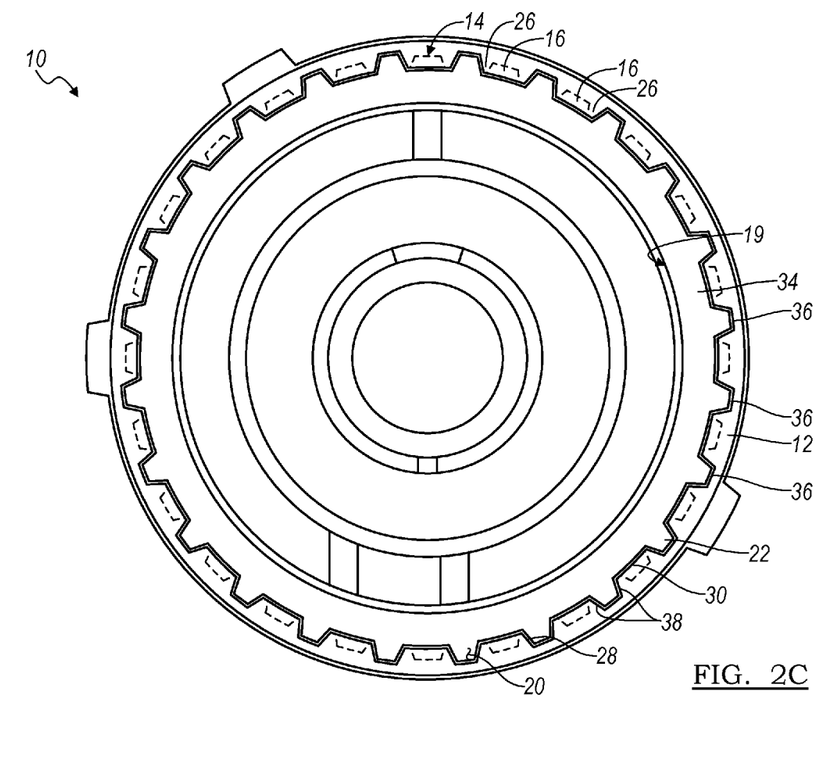
FIG. 2C is a plan view of the clocked retaining assembly of FIGS. 1A-1B, assembled in accordance with the principles of the present disclosure.

Referring now to FIGS. 2A-2B, the clocked retaining assembly is illustrated partially assembled, and in FIG. 2C, it is illustrated fully assembled. In FIG. 2A, the splines 16, 22 of the backing plate 14 are shown mated with the splines 26, 30 of the transmission case component 12. The backing plate 14 is slide along the splines 26, 30 of the transmission case component to begin the assembly of the two components. Accordingly, the male spline teeth 16 of the backing plate 14 are inserted into the female grooves 30 of the transmission case component 12, and the male spline teeth 26 of the transmission case component 12 are inserted within the female grooves 22 of the backing plate 14. In this phase of the assembly, the backing plate 14 can slide along the center axis X (into and out of the page, in the illustrated view) of the transmission case component 12, but the backing plate 14 and the transmission case component 12 cannot rotate with respect to each other, because the mated configuration of the splines 16, 22, 26, 30 prevents them from rotating with respect to each other. The backing plate 14 is slid along the splines 26, 30 of the transmission case component 12 and into the circumferential slot 32 (not visible in FIG. 2A).

Referring to FIG. 2B, once the backing plate 14 is located axially within the circumferential slot 32 of the transmission case component 12, the male spline teeth 26 of the transmission case component 12 no longer prevent the backing plate 14 from rotating with respect to the transmission case component 12. Rotation between the backing plate 14 and the transmission case component 12 is possible when the backing plate 14 is located within the circumferential slot 32 because the male spline teeth 26 of the transmission case component 12 are absent from the circumferential slot 32. Therefore, the backing plate 14 can be rotated with respect to the transmission case component 12 when it is located within the circumferential slot 32.

In FIG. 2B, the backing plate 14 is rotated within the circumferential slot 32 so that the male spline teeth 16 of the backing plate 14 are aligned with and overlap the male spline teeth 26 of the transmission case component 12. Simultaneously, the female grooves 22 of the backing plate 14 overlap with the female grooves 30 of the transmission case component 12, creating open spaces along a length of the transmission case component 12 parallel to the central axis X in the space of the female grooves 22, 30. Since the male spline teeth 26 of the clutch housing are located over the male spline teeth 16 of the backing plate, the backing plate 14 cannot slide axially along the central axis X of the transmission case component 12 when the backing plate 14 is rotated as shown in FIG. 2B. Therefore, the male spline teeth 26 of the transmission case component 12 prevent the backing plate 14 from axially moving with respect to the transmission case component 12. In other words, the male spline teeth 26 of the transmission case component 12 lock the backing plate 14 from moving axially with respect to the transmission case component 12, and no snap ring is needed to axially hold the backing plate to prevent it from sliding along the central axis X. Therefore, a snap ring can be omitted.

Referring now to FIG. 2C, the pin plate 34 is then installed within the transmission case component 12. The extensions 36 are slid into the female grooves 30, 22 of the transmission case component 12 and the backing plate 14 to prevent the backing plate 14 from rotating with respect to the transmission case component 12. Edges 38 on each of the extensions 36 abut against the edges 20, 28 of the male splines 16, 26 of the backing plate 14 and the transmission case component 12, thereby preventing rotational movement between the transmission case component 12 and the backing plate 14. In other words, the extensions 36 are inserted into the openings between the backing plate 14 and the transmission case component 12 when the backing plate is turned so that the male spline teeth 16 of the backing plate 14 overlap with the male spline teeth 26 of the transmission case component 12.

Figure 3:
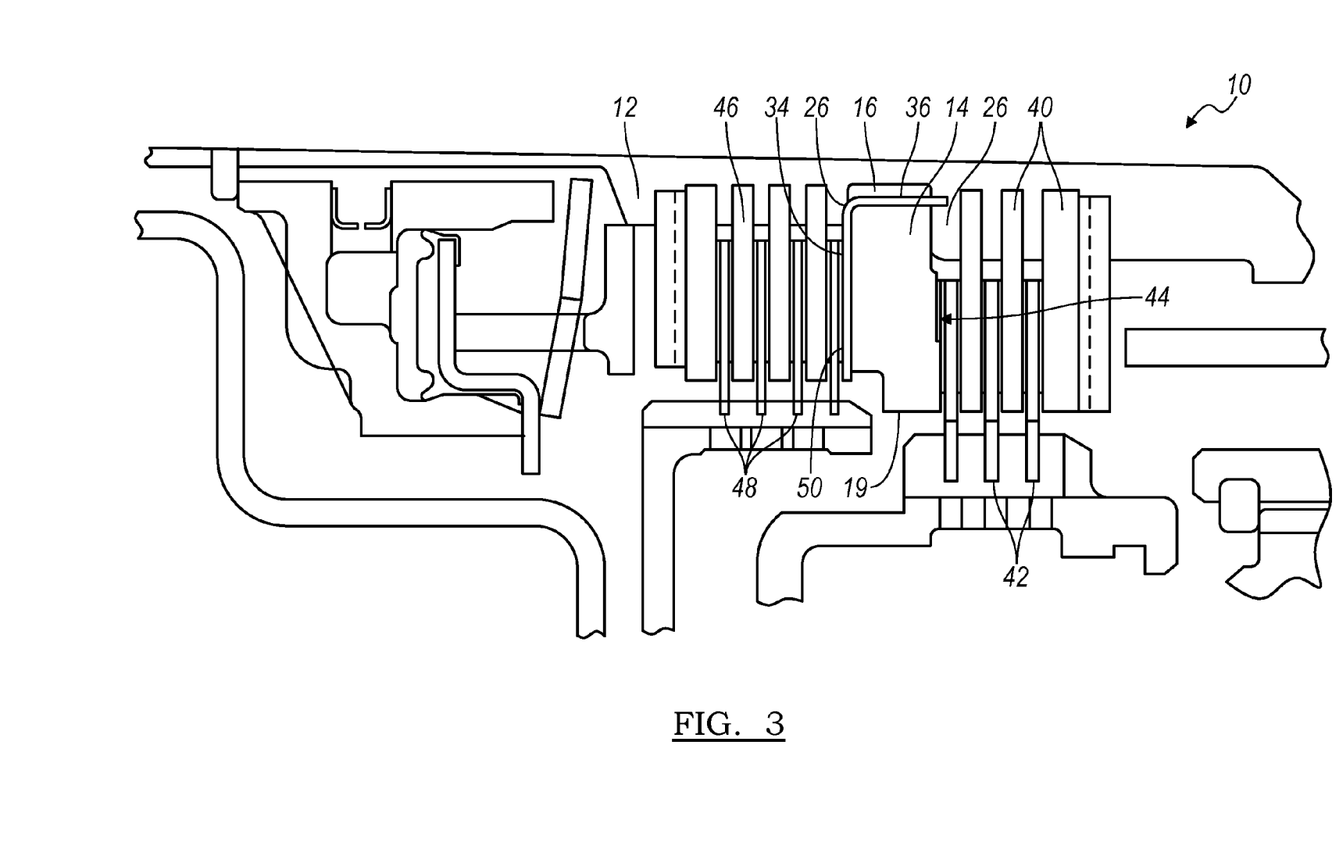
FIG. 3 is a side cross-sectional view of the clocked retaining assembly of FIGS. 1A, 1B, and 2C, according to the principles of the present disclosure.

Referring to FIG. 3, the clocked retaining assembly 10 is illustrated in an assembled side cross-sectional view. The backing plate 14 and the pin plate 34 are installed within the transmission case component 12. The extensions 36 of the pin plate 34 prevent the backing plate 14 from rotating relative to the transmission case component 12. The male spline teeth 26 of the transmission case component 12 prevent the backing plate from axially moving along the central axis X. Together, the inner surface 24 of the transmission case component 24, including the male spline teeth 26 of the transmission case component 12, and the extensions 36 prevent the backing plate 14 from moving in any direction; in other words, they constrain the backing plate 14 in all directions.

A first set of interleaved clutch plates 40, 42 are disposed adjacent to a first side 44 of the backing plate 14. A second set of interleaved clutch plates 46, 48 are disposed adjacent to a second side 50 of the backing plate 14. Accordingly, the backing plate 14 serves as a surface against which two different clutch packs may be applied. In other words, the first set of interleaved clutch plates 42, 44 are applied against the first side 44 of the backing plate 14, and the second set of interleaved clutch plates 46, 48 are applied against the second side 50 of the backing plate 14. Therefore, a single backing plate 14 is used by both sets of clutch plates. No snap ring is used in this embodiment.

The figures herein illustrate one variation of the present invention. In other embodiments, other transmission components have the clocked retaining assembly described herein. For example, a clutch hub may be fixed to the transmission case component 12 in a similar manner. In particular, another set of male spline teeth of the transmission case component 12 having a circumferential slot formed therethrough, in which the clutch hub may be "clocked" or partially turned to align and overlap male spline teeth of the clutch hub with male spline teeth of the transmission case component 12 to prevent the clutch hub from axially moving with respect to the transmission case component 12. Another pin plate 34 or other pins may be used to rotationally lock the clutch hub and transmission case component 12 together, for example, as described above with respect to the transmission case component 12 and the backing plate 14.

In still other embodiments, the two transmission components utilizing the clocked retaining features and method described herein could include a piston housing and a transmission case, a center support and a transmission case, or any other two components that are splined together and to which it is desired to prevent axial movement therebetween.

Figure 4:
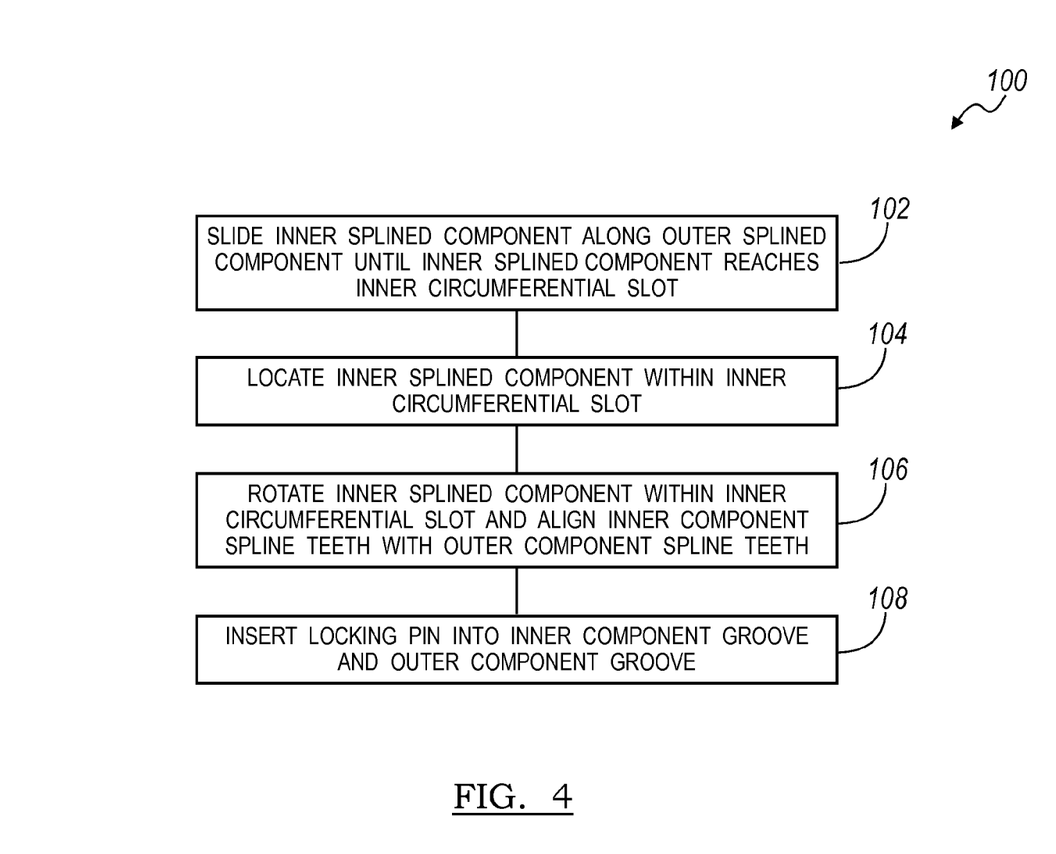
FIG. 4 is a block diagram illustrating a method for retaining an inner splined component to an outer splined component, in accordance with the principles of the present disclosure.

In another form, with reference to FIG. 4, the present disclosure includes a method 100 for retaining a splined transmission component to another splined transmission component. The method includes a step 102 of sliding complimentary inner and outer splined components along each other until the inner component reaches a circumferential slot formed in the outer component. The method 100 includes a step 104 of locating the inner component within the circumferential slot. The method 100 also includes a step 106 of turning or rotating the inner component within the inner circumferential slot and aligning the inner component spline teeth with the outer component spline teeth. The spline teeth should be aligned such that spline teeth of the inner component overlap spline teeth of the outer component in an axial direction along a central axis. The method 100 may include a step 108 of inserting a locking pin into female grooves formed by edges of the inner and outer teeth to prevent the inner and outer components from moving in a rotational direction with respect to each other.

Other steps and structures described in other paragraphs could also be incorporated into the method disclosed herein. For example, the method 100 may include providing multiple locking pins and disposing sets of clutch plates adjacent to the inner component.

The description of the invention is merely exemplary in nature and variations that do not depart from the gist of the invention are intended to be within the scope of the invention. Such variations are not to be regarded as a departure from the spirit and scope of the invention.

What is claimed is:

1. A clocked retaining assembly for use in an automotive powertrain, the clocked retaining assembly comprising:
    an inner component having an outer side, the outer side having a plurality of inner spline teeth separated by a plurality of inner grooves formed in the outer side;
    an outer component having an inner side, the inner side having a plurality of outer spline teeth separated by a plurality of outer grooves formed in the inner side, the outer spline teeth being configured to mate with the inner grooves and the inner spline teeth being configured to mate with the outer grooves, the outer component forming a continuous circumferential slot through the outer spline teeth around the inner circumference of the inner side, the plurality of inner spline teeth being disposed in the circumferential slot, the inner spline teeth being disposed adjacent to and axially aligned with the outer spline teeth, the inner and outer grooves being axially aligned; and
    a pin component having a main body portion and a pin extension extending from the main body portion, the pin extension being disposed in a first inner groove of the plurality of inner grooves, and the pin extension being further disposed in a first outer groove of the plurality of outer grooves, the pin extension preventing the inner component from rotating with respect to the outer component.

2. The clocked retaining assembly of claim 1, wherein the inner and outer sides are round, and wherein the outer component is disposed concentrically around the inner component.

3. The clocked retaining assembly of claim 2, wherein the pin extension is a first pin extension, the pin component having a second pin extension extending from the main body portion, the second pin extension being disposed in a second inner groove of the plurality of inner grooves, and the second pin extension being further disposed in a second outer groove of the plurality of outer grooves.

4. The clocked retaining assembly of claim 3, wherein the main body portion of the pin component has an annular shape.

5. The clocked retaining assembly of claim 4, wherein the main body portion is disposed substantially within a plane, the first and second pin extensions extending in a substantially perpendicular direction with respect to the plane of the main body portion.

6. The clocked retaining assembly of claim 5, further comprising a set of interleaved clutch plates disposed adjacent to the inner component.

7. The clocked retaining assembly of claim 6, wherein the set of interleaved clutch plates is a first set of interleaved clutch plates that is disposed adjacent to a first side of the inner component, the clocked retaining assembly further comprising a second set of interleaved clutch plates disposed adjacent to a second side of the inner component.

8. A clutch assembly for use in an automotive powertrain, the clutch assembly comprising:
    a backing plate having an outer side, the outer side having a plurality of backing plate spline teeth separated by a plurality of backing plate grooves formed in the outer side;
    an outer component having an inner side, the inner side having a plurality of outer spline teeth separated by a plurality of outer grooves formed in the inner side, the outer spline teeth being configured to mate with the backing plate grooves and the backing plate spline teeth being configured to mate with the outer grooves, the outer component forming a continuous circumferential slot through the outer spline teeth around the inner circumference of the inner side, the plurality of backing plate spline teeth being disposed in the circumferential slot, the backing plate spline teeth being disposed adjacent to and aligned with the outer spline teeth, the inner and outer grooves being axially aligned; and
    a pin component having a main body portion and a pin extension extending from the main body portion, the pin extension being disposed in a first backing plate groove of the plurality of backing plate grooves, and the pin extension being further disposed in a first outer groove of the plurality of outer grooves, the pin extension preventing the backing plate from rotating with respect to the outer component.

9. The clutch assembly of claim 8, wherein the inner and outer sides are round, and wherein the outer component is disposed around the backing plate.

10. The clutch assembly of claim 9, wherein the pin extension is a first pin extension, the pin component having a second pin extension extending from the main body portion, the second pin extension being disposed in a second backing plate groove of the plurality of backing plate grooves, and the second pin extension being disposed in a second outer groove of the plurality of outer grooves.

11. The clutch assembly of claim 10, wherein the main body portion of the pin component has an annular shape, and the backing plate has an annular shape.

12. The clutch assembly of claim 11, wherein the main body portion is disposed substantially within a plane, the first and second pin extensions extending in a substantially perpendicular direction with respect to the plane of the main body portion.

13. The clutch assembly of claim 12, further comprising a set of interleaved clutch plates disposed adjacent to the backing plate.

14. The clutch assembly of claim 13, wherein the set of interleaved clutch plates is a first set of interleaved clutch plates that is disposed adjacent to a first side of the backing plate, the clutch assembly further comprising a second set of interleaved clutch plates disposed adjacent to a second side of the backing plate.

* * * * *